Feb. 2, 1926.
V. G. VAUGHAN
ELECTRICALLY HEATED APPLIANCE
Original Filed April 8, 1924
1,571,922
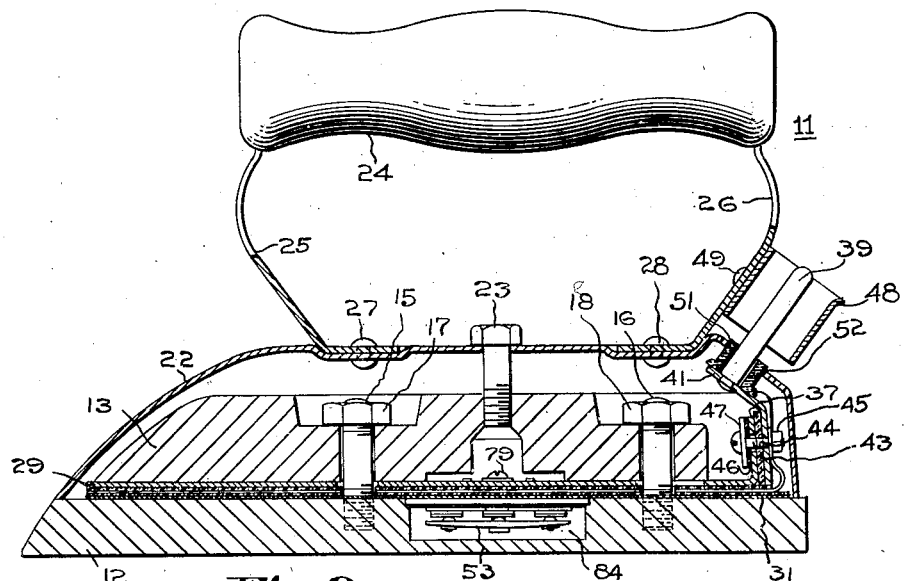
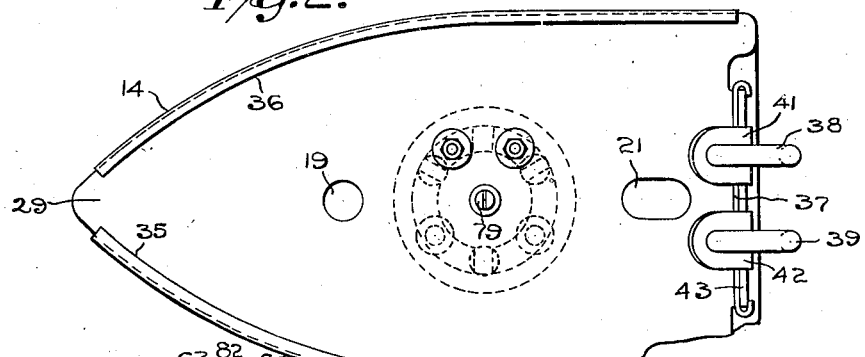
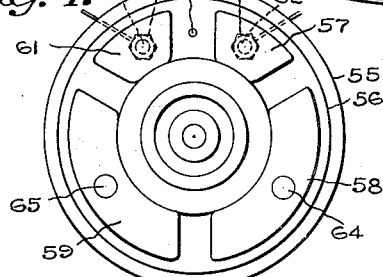
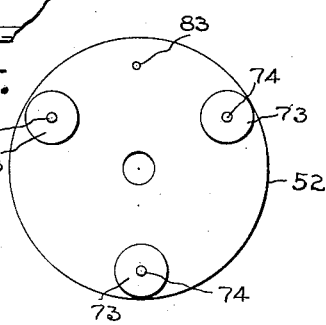
WITNESSES:
INVENTOR
Victor G. Vaughan
BY
Wesley G. Carr
ATTORNEY Patented Feb. 2, 1926.

1,571,922

UNITED STATES PATENT OFFICE.

VICTOR G. VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICALLY-HEATED APPLIANCE.

Application filed April 8, 1924, Serial No. 704,973. Renewed January 7, 1926.

*To all whom it may concern:*

Be it known that I, VICTOR G. VAUGHAN, a citizen of the United States, and a resident of Wilkinsburg, in the county of Allegheny and State of Pennsylvania, have invented a new and useful Improvement in Electrically-Heated Appliances, of which the following is a specification.

My invention relates to electrically heated appliances and particularly to unitary heating unit and thermostatic-switch aggregates for such devices.

The object of my invention is to provide a relatively simple, compact and unitary heating unit and thermostatically actuated switch.

In practicing my invention, I provide an encased heating unit adapted to be mounted in an appliance to be heated thereby and secure thereagainst a thermostatically-controlled switch aggregate.

In the single sheet of drawings,

Figure 1 is a view, partially in vertical section and partially in side elevation, of an electric iron with which is associated a device embodying my invention, Fig. 2 is a top plan view of a device embodying my invention, Fig. 3 is a view, in vertical, lateral section, through a thermostatic switch aggregate, Fig. 4 is a bottom plan view of a portion of a switch aggregate, Fig. 5 is a top plan view of a thermostatic element associated with the portion illustrated in Fig. 4, and Fig. 6 is a bottom plan view of a portion of the switch aggregate.

An electric iron 11 comprises a bottom plate 12, a top plate 13 and an encased heating element 14 located therebetween, the bottom top plates and the interposed heating element comprising the body portion of the iron. The top plate may be secured against the bottom plate by means of a pair of studs 15 and 16 having co-operating nuts 17 and 18 located at the top thereof by means of which the top plate may be tightly clamped against the heating element and the latter may be tightly clamped against the top surface of the bottom plate. Spaced openings 19 and 21 are provided in the heating unit 14 to permit of the studs 15 and 16 extending therethrough.

A cover plate 22 is held against the peripheral portion of the top surface of the bottom plate 12 and in its proper operative position thereon by a single machine bolt 23 that has screw threaded engagement with the top plate 13. A handle 24 is mounted at the top of the iron and is secured to the upper ends of handle straps 25 and 26, the lower ends of which are secured to the cover member by rivets 27 and 28, respectively.

The heating unit 14 comprises an upper plate 29, of relatively thick sheet metal, a lower plate 31 of sheet metal that may be somewhat thinner than the top plate, and a resistor member 32 that is located between an upper sheet 33 of mica and a lower sheet 34 of mica. Any desired construction of resistor, and of resistor mounting may be employed, and I have therefore, illustrated the particular type of resistor schematically only.

The heating unit 14 is of substantially triangular shape in contour to agree with the general contour of the bottom and of the top plates respectively. The lower plate 31, of sheet metal, is folded over and around the upper sheet metal plate 29 by integral flanged portions 35 and 36, as is illustrated more particularly in Fig. 2 of the drawings in order to provide a construction in which the component parts shall be tightly held in their proper positions relatively to each other.

The rear portion of the top plate 29 is bent upwardly at substantially right angles to the major portion of the plate, the angularly-extending portion being designated by the numeral 37 in Fig. 1 of the drawing, to provide a supporting means for a terminal structure comprising a plurality of spaced terminal pins 38 and 39, the lower ends of which are connected respectively to two terminal bars 41 and 42, that are of substantially L-shape. The lower ends of the bars 41 and 42 are located adjacent to the bent-up portion 37 of the top plate 29 and are insulated therefrom by a sheet 43, of mica. The ends of the resistor member 32 are electrically connected to the respective bars 41 and 42 by small machine screws 44 and co-operating nuts 45, a relatively narrow piece 46, of mica, being provided on the other surface of the turned-up portion 37 to insulate a metal washer 47 therefrom. This construction provides a relatively secure mounting for the angularly projecting pins 38 and 39, which, as shown in Fig. 1 of the drawing, extend substantially parallel to the intermediate portion of the handle strap 26 and are located within a guard 48 that is secured to the handle strap 26 by a rivet 49.

An insulating member 51 that is disposed in and extends through a suitable opening 52 in the cover may be of elongated form and have a plurality of openings therein to permit of the pins 38 and 39 extending therethrough, to insulate the terminal pins from the cover portion 22.

Means for thermostatically controlling the energization of the heating unit 14 and particularly the resistor 32 thereof when connected to a suitable supply circuit by the usual plug and supply cord (not shown), comprises a thermostatic disk 53 that is preferably made of circular or dish form. A supporting plate 54, of somewhat larger diameter than the thermostatic disk 53, has located thereagainst a second circular plate 55, on the outer surface of which there is mounted a circular plate 56 of mica.

A plurality of spaced contact plates 57, 58, 59, and 61 are secured against the outer surface of the mica plate 56 by suitable bolts or rivets. The plates 57 and 61 are secured respectively by bolts 62 and 63 extending through the mica and through the plate 55, suitable openings (not shown) being provided in the plate 54 to receive the head of the respective bolts 62 and 63.

The plates 58 and 59 are similarly secured against the mica sheet 56 and the plate 55 by rivets 64 and 65. The arcuate extent of the plates 57 and 61 is substantially equal and is less than the arcuate extent of the plates 58 and 59. A suitable, radially-extending clearance space is provided between the respective terminal plates 57, 58, 59 and 61. The bolts 62 and 63 are provided at their inner end with nuts 66 and 67 to permit of connecting thereto the intermediate ends of the resistor member 32 which have been provided at substantially the central portion of the heating unit, as the structure being described is located at substantially the central portion of the heating unit as is illustrated in Fig. 2 of the drawing.

The thermostatic disk 53 has mounted thereon a plurality of contact members, each of which comprises an outer mica washer 68, an inner mica washer 69, an outer metal washer 71, an inner metal washer 72, and a bridging contact member 73 that is loosely mounted on a rivet member 74 that is effective to tightly hold the members 68, 69, 71 and 72 on the disk 53.

Three suitably spaced bridging contact structures, as hereinbefore described, are mounted on the disk 53 in such position as to operatively engage respectively the opposed edge-portions of the pairs of plates 57 and 58, 58 and 59, and 59 and 61, so long as the disk 53 is in substantially the position illustrated in Fig. 3 of the drawings. The edge portions of the contact plates may be treated by any of the known methods used in the art to prevent or reduce the deleterious effect of such arcing as may occur upon interruption of the circuit. A preferred method is to apply a thin coating of silver to the edge portions.

The plates 54, 55 and 56 are secured together by a tubular member 75, the outer ends of which may be expanded over against the respective outer surfaces of the plates 54 and 56 and that may be provided with interior threads to receive a stud or bolt 76, that constitutes a support for the disc 53, whereby the latter may be adjusted relatively to the supporting plates hereinbefore described. The outer head of the member 76 is provided with a pair of spaced openings 77 and 78, that are adapted to be engaged by a small spanner wrench to effect the proper adjustment of the plate 53 and of the contact bridging members relatively to the contact plates hereinbefore described, which adjustment determines the temperature at which the bimetallic disk 53 will effect disengagement of the contact bridging members 73 from their co-operating terminal plates with which they are normally in engagement. The upper end of the member 76 may be riveted in the member 75, thus fixing the adjustment and making it impossible to effect changes in the adjustment without substantially destroying the switch aggregate.

Means for securing the thermostatic switch aggregate, hereinbefore described, against the under surface of the heating unit 14 comprises a machine screw 79 and a washer 81, the machine screw 79 extending into the tubular member 76 which is interiorly threaded to receive it. Relative turning movement of the disc and base is prevented by a pin 82 secured to the switch, and projecting through an opening 83 in the disc.

The main features of the hereinbefore described switch aggregates are those described and claimed in a co-pending application of J. A. Spencer, filed August 9, 1923, Serial No. 656,528, and assigned to the Spencer Thermostat Company.

The hereinbefore described switch aggregate is secured against the under surface of the heating unit 14 and a suitable chamber 84 is provided in the upper surface of the bottom or sole plate 12 to receive the switch aggregate.

In the ordinary electric irons, it is highly desirable that the thermostatic control element be directly subjected to the heat of the lower plate which is effective to cause the smoothing of any cloth or article of wearing apparel that is to be ironed. During normal operation of the iron, the temperature of the heating unit located between the bottom and the top plates is higher than that either at the bottom surface of the bottom plate or the top surface of the top plate, and hence prevents a flow of heat from the top plate to the bottom plate if the latter is cooled, as may be the case when a very thick and damp article, such as a table cloth, is being ironed. Hence, if the thermostatic element is influenced by the top plate, it may happen that the top plate is hot enough to cause the thermostatic switch to interrupt the circuit, while the bottom plate may be too cool to effect proper ironing.

The location of the thermostatic switch aggregate hereinbefore described against the under surface of the heating unit provides a mounting wherein the thermostatic element is directly influenced by the heat from the bottom plate rather than by the heat from the heating element. This is more particularly the case by reason of the fact that the surface area of the disk is influenced by the heat radiated thereagainst by the bottom plate and the thermal resistance of this heat path is much lower than that of the path from the heating unit to the switch aggregate and the disk.

The intimate contact between the normally polished upper surface of the bottom plate and the metal bottom plate of the heating unit is sufficient to cause the heat to flow from the heating unit into the bottom plate and even though the switch aggregate is mounted directly against the bottom surface of the heating unit, it is affected less by the heat therefrom than by the heat from the bottom plate.

The device embodying my invention provides a heating unit of the encased type that has a thermostatically-controlled switch aggregate of relatively small dimensions secured thereto in such manner as to make it substantially impossible to change the adjustment of the thermostatic disk and switch aggregate, once it has been properly set in the factory. This prevents tampering with the switch in such manner as to make it possible to cause the thermostatic disk to operate at a relatively higher temperature, thereby destroying the protective effects of such a thermostatically controlled switch.

Various modifications and changes may be made without departing from the spirit and scope of the invention, I desire therefore, that only such limitations shall be placed thereon as are imposed by the prior art.

I claim as my invention:

1. In combination, an encased electric heating unit and a thermostatically-controlled switch assembly directly supported thereby.

2. In combination, a heating unit comprising a resistor member, insulation therefor, and an enclosing metal casing, and a thermostatically-actuated switch assembly for controlling said resistor member secured to said casing at only a single point.

3. A unitary structure comprising an encased electric heating unit and a thermally-actuated circuit controlling means therefor, said structure being adapted to be operatively associated with a device to be heated by said heating unit and being removable therefrom as a unit.

4. A unitary structure comprising an encased heating unit, a thermostat, and a circuit-controlling means for said heating unit actuated by said thermostat, said structure being adapted to be operatively associated with a device to be heated by said heating unit, said circuit-controlling means and said thermostat being secured to the casing of said heating unit at only a single point whereby the thermostat is subjected to the heat stored in the device.

5. A unitary structure for a device to be heated having a sole plate, comprising an encased heating unit supported by said sole plate, and a thermostatically-actuated circuit-controlling means operatively associated with and directly supported by said heating unit and subjected primarily to the heat of said sole plate.

6. A unitary structure for an electric iron having a top plate and a sole plate having a depression in one surface thereof, comprising an encased heating unit clamped between said top plate and said sole plate, and a thermostatically-actuated switch-assembly directly supported by said heating unit and located in the depression in said sole plate and operative to maintain the temperature of said sole plate within predetermined temperature limits.

7. A unitary structure for a device having a sole plate, comprising an encased heating unit clamped against, supported by, and adapted to heat said sole plate, a thermostat and a switch controlled thereby operatively secured to and directly supported by said heating unit, the thermal resistance of the heat path from the heating unit to the thermostat being greater than the thermal resistance of the heat path from the sole plate to the thermostat.

In testimony whereof, I have hereunto subscribed my name this 27th day of March 1924.

VICTOR G. VAUGHAN.